July 18, 1939.  A. SCHWARZKOPF  2,166,706
EGG TESTING DEVICE
Filed Jan. 16, 1937  2 Sheets-Sheet 1
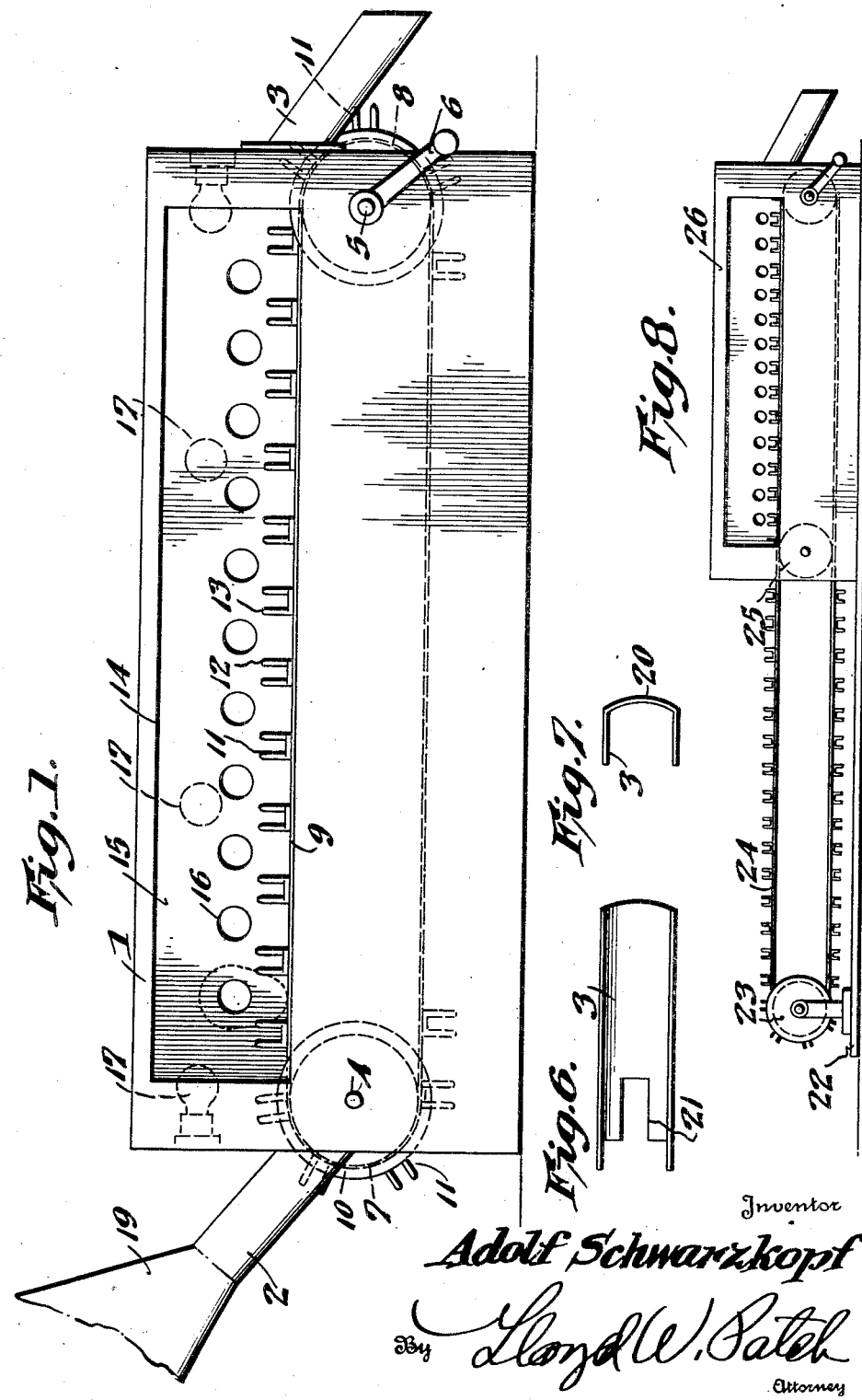
Inventor
Adolf Schwarzkopf
By Lloyd W. Patch
Attorney

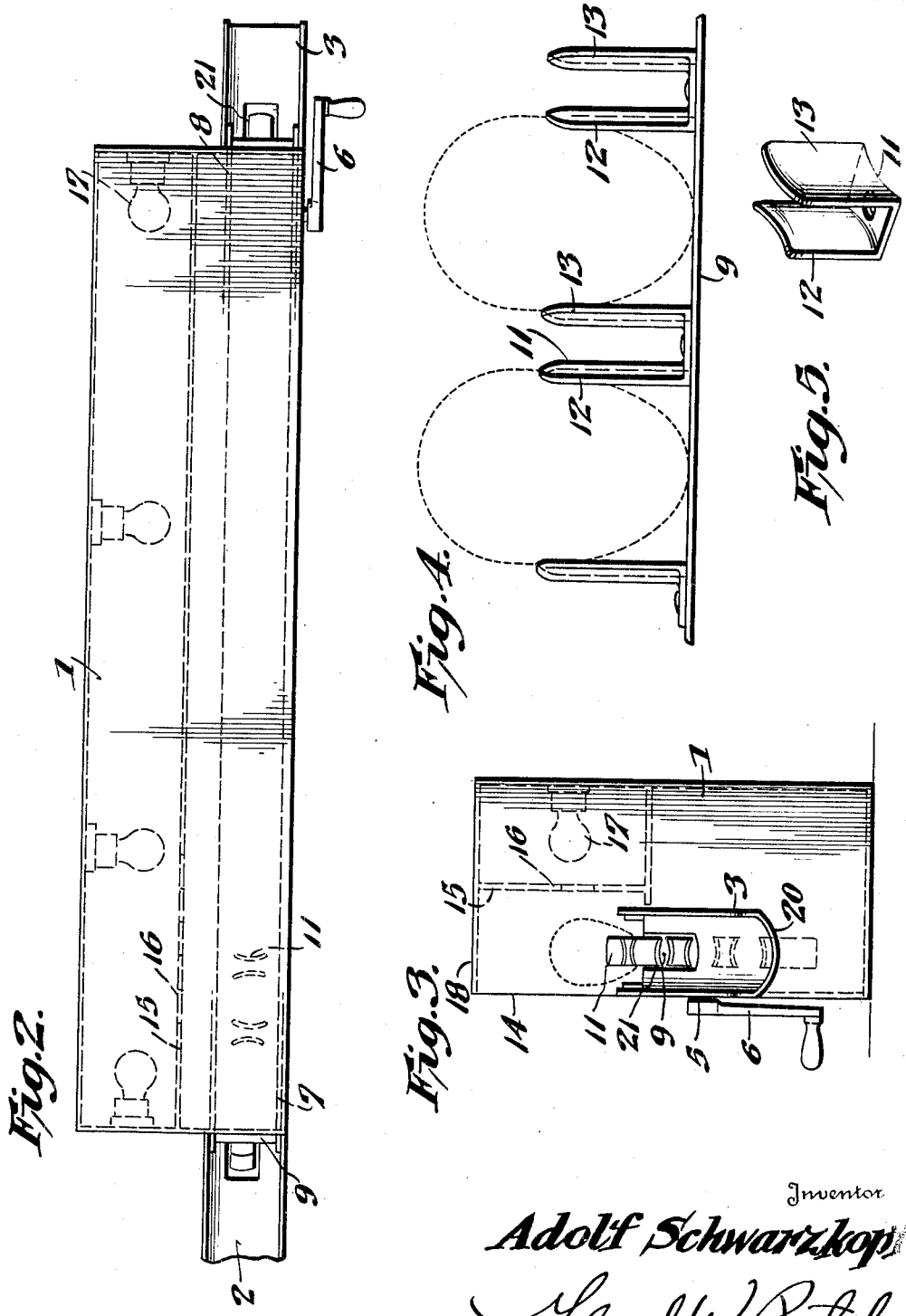

Patented July 18, 1939

2,166,706

UNITED STATES PATENT OFFICE 2,166,706

EGG TESTING DEVICE

Adolf Schwarzkopf, Miami Beach, Fla., assignor of one-third to William F. A. Buehner, Miami, Fla.

Application January 16, 1937, Serial No. 121,001

4 Claims. (Cl. 88—14.8)

My invention relates to improvements in egg testing devices, and particularly to an egg tester of the candling type intended and adapted to be used in testing or candling large quantities of eggs.

An object of this invention is to provide an apparatus which can be used to handle a large number of eggs and which is of such construction that the eggs can be readily supplied to be carried in a substantially continuous line past the candling or inspection point or location, and will then be discharged or removed into a suitable receptacle without further handling or manual operation.

Another object is to so construct and arrange the parts that a plurality of eggs will be disposed in testing position with a light placed to render the eggs translucent, and yet the light is so shaded and localized that there is no spreading of light to interfere with the quick and ready inspection and observation of the condition and color and character of the eggs.

Still another purpose of my invention is to provide a device of this character which is of simple and inexpensive construction, thus making the apparatus available for use by farmers, retail merchants, and others who may desire to test quantities of eggs without investing in expensive mechanism, and which will permit the user to view and test and candle each individual egg completely and thoroughly; and, which apparatus or device is of such construction that it can be readily and conveniently operated by hand, thus eliminating the necessity for and expense of electrical current connection and supply, or other motive power.

With the above and other objects and purposes in view, some of which will be apparent to those skilled in the art and others of which are inherent in the construction and use and operation of the device, my invention includes certain novel features of construction and combinations and arrangements of parts which will be hereinafter set forth in connection with the drawings and then pointed out in the claims.

In the drawings:

Figure 1 is a view in side elevation showing one embodiment of my invention.

Fig. 2 is a view in top plan of the structure illustrated in Figure 1.

Fig. 3 is a view in elevation looking toward the discharge end of the device.

Fig. 4 is an enlarged fragmentary detail view to better show the egg carrying and holding means.

Fig. 5 is a perspective view to better illustrate portions of the egg holding parts.

Fig. 6 is a view in top plan of the egg discharge chute.

Fig. 7 is a view in end elevation of the egg discharge chute.

Fig. 8 is a view in side elevation, and upon a reduced scale, showing a modified construction of the device.

A case structure 1, which can be made up of sheet metal or of any other material, and which can be of the substantially prismatic form illustrated or of any other desired and suitable shape, is mounted or supported or constructed upon any suitable base. This case 1, and in fact the entire device, can be made of a shape and size and form to be readily portable, and can be dimensioned to be sufficiently compact that it can be used, and can be stored when not in use, by an individual desiring to make egg tests without requiring or necessitating special installations or a special location or support for the device.

An egg supply trough or chute 2 is provided at one end of the case 1, and the egg discharge trough or chute 3 is carried at the opposite end, and for convenience in description the end adjacent to the supply trough or chute 2 will be hereinafter referred to as the supply end while the end adjacent to the discharge trough or chute 3 will be designated as the discharge end.

Adjacent to the supply end, a carrying shaft 4 is journaled or its otherwise revolubly mounted to extend transversely and substantially horizontally within the case 1, and a power shaft 5 is similarly mounted adjacent to the discharge end. A crank handle 6, or other suitable means, is provided on the shaft 5 so that this power or drive shaft 5 can be readily rotated by an operator standing in front of the machine and using one hand to manipulate the operating handle 6. The carrying shaft 4 has a belt drum 7 thereon, and a similar belt drum 8 is fixed on the power or drive shaft 5 to be rotated therewith. An endless flat belt 9, of fabric webbing, or of any other suitable material, is fitted upon the belt drums 7 and 8 so that the upper sides thereof extend substantially horizontally, and to retain the belt 9 on the drums 7 and 8, it is perhaps preferable that these drums be provided with side flanges 10 which also serve to hold the belt against lateral shifting or displacement.

The belt 9 has a plurality of egg receiving and holding clips 11 secured on the outer face thereof by means of rivets or other suitable fastenings. The construction and mounting of the egg holding clips is perhaps best illustrated in Figs. 4 and 5, and as shown, the clips 11 have two upstanding flanges 12 and 13, the upstanding flanges being formed to extend substantially at right angles from the surface of the belt 9 and being made concave on their outer faces. The space between the upstanding flanges 12 and 13 is relatively narrow, and is only sufficient to provide clearance for adjacent sides of two eggs held between adjacent clips, as illustrated in Fig. 4. Between the mounting of the egg holding clips 11, the belt material 9 is flexible, and as the belt 9 travels over the drums 7 and 8, the concave sides of adjacent clips 11 will separate outwardly from the substantially parallel relation illustrated in Fig. 4, so that the sides 12 and 13 of the egg holding clips 11 will extend in substantially radial relation, for the purpose to be hereinafter more fully set forth.

At its forward side, the case 1 has an opening 14 provided therethrough and extending substantially horizontally in line with a row of eggs carried by the belt 9 on the upper substantially horizontal length thereof. Through this opening 14, the eggs can be viewed in ordinary daylight, or with the aid of external surface illumination, to permit inspection and observation of the color, size and other external characteristics. Immediately in the rear of the belt 9, in the upper part of the case 1 and back of the opening 14, a light shield wall 15 is provided, and this light shield wall has a plurality of openings 16 formed therethrough and spaced to correspond substantially with the spacing of the centers of eggs carried by the several egg holding clips 11 upon the belt 9. Within the case and back of the light shading wall or partition 15, I provide suitable illuminating means at 17. In the present instance I have illustrated the use of several electric light bulbs suitably placed and wired to give substanially equal illumination through the several openings 16, but it will be understood that any other form and type of light emitting or illuminating means can be employed. As the eggs travel in the space between the upper run or length of the belt 9 and the top 18 of the case 1, the eggs will be somewhat shaded on their upper and lower ends and upon the far and lateral sides, the forward side being readily available for inspection to ascertain the color and other characteristics. As the eggs are shaded and the source of light is shielded to permit light rays to penetrate and be emitted only through the openings 16, as the eggs are brought into registry with these openings the light will be centralized and concentrated to render the eggs translucent for clear and close inspection, and as the operator stands or sits in front of the machine in position to operate the crank handle 6, he can readily and conveniently and quickly candle and determine the characteristics of a large number of eggs as these are carried by the belt 9 into positions where they are interposed between the operator or user and the light emitting openings 16.

The eggs may be placed in a hopper or container 19, and from this hopper or container can pass to the supply chute or trough 2, and as the side flanges 12 and 13 of the egg holding clips 11 are so closely spaced that the end of an egg will not enter, the only way that an egg can be brought into contact with the conveyor or carrier belt 9 is that the egg fit endwise between the flange 12 of one clip 11 and the opposed flange 13 of the next adjacent clip 11.

With the supply chute or trough 2 extending substantially radially with respect to the shaft 4, and this trough made of a transverse dimension to guide the egg downwardly at an incline with one end presented forwardly, the end of the egg will thus be presented to rest between the opposed flanges of adjacent clips. Due to the fact that the flange portions are open or separated out to extend radially, when the belt 9 is passing around the drum 7, the egg will readily enter between the flared flanges of the adjacent egg holding clips 11, and as the belt 9 is advanced the egg will be carried therewith, the opposed flanges of the adjacent egg holding clips being again restored to substantially parallel relation when the belt 9 reaches the straight line of travel, and the egg being thus held in upright relation and against lateral twisting or displacement. Likewise, when the upper run of the belt 9 bends over and around the drum 8, the opposed faces of adjacent egg holding clips are again separated or flared to extend substantially radially with respect to the axis of shaft 5, in consequence of which the eggs are released adjacent to the discharge chute or trough 3. This discharge chute or trough 3 will be inclined sufficiently to permit the eggs to travel outwardly along the length thereof, and the trough is preferably made with a concave bottom 20, as best shown in Fig. 7. By providing a recess 21 in the bottom 20 of this discharge chute or trough, sufficient clearance is given for free passage of the egg holding clips, and at the same time the eggs are bodily lifted or moved outwardly to a position to clear the egg holding clips. In this way the eggs are conveniently supplied to the device, are held during the testing operation and interval, and are then positively removed to a position to permit continued and uninterrupted operation of the device. The discharge trough or chute 3 can be led to any convenient or desired receptacle, and by governing the inclination of this chute or trough the movement of the eggs toward the discharge end thereof can be accordingly varied to prevent breakage or damage.

The testing device can be made of any desired length to accommodate a greater or lesser number of eggs, and a greater or lesser number of light emitting openings 16 can be provided.

As illustrated in Fig. 8, the base 22 can be considerably extended, at one or both ends, and the conveyor or carrier belt roller 23 can be mounted on this extending portion to thus dispose a portion of the belt 24 entirely outside of the case 26. With this arrangement, the exposed portion of the belt may help in permitting placement of the eggs, and in the superficial or external inspection and observation. Where the belt is made of considerable length, it may be found desirable to introduce supporting rollers 25 to carry the straight upper run of the conveyor belt 24, or, a table or support might be erected under the upper carrier extent of the belt 24.

While I have herein shown and described only certain specific embodiments of my invention and have suggested only certain possible changes, it will be appreciated that many variations and modifications can be made in the form, construction, arrangement, assembly, association and manner of use of the parts, without departing from the spirit and scope of my invention.

I claim:

1. An egg testing device comprising, a case having light emitting openings formed laterally therein, light emitting means within the case, an endless belt, belt rollers mounting said endless belt with a straight portion thereof adjacent to the light emitting openings, egg holding clips carried in paired spaced relation upon said belt provided with flanges having opposed concavity on adjacent paired clips, said clips being adapted to extend in upright relation with the opposed concave sides engaging one end of and holding an egg in upright position upon the upper egg carrying portion of the belt when the belt is straight and to extend substantially radially with the opposed flanges of paired egg holding clips flared and separated to egg receiving and releasing relation when the belt travels over the rollers, and means to move said belt over the rollers to move eggs carried by said egg holding clips in front of the light emitting openings.

2. An egg testing device comprising, a case having light emitting openings formed laterally therein, light emitting means within the case, an endless belt, belt rollers mounting said endless belt with a straight portion thereof adjacent to the light emitting openings, egg holding clips carried in paired spaced relation upon said belt provided with flanges having opposed concavity on adjacent paired clips, said clips being adapted to extend in upright relation with the opposed concave sides engaging one end of and holding an egg in upright position upon the upper egg carrying portion of the belt when the belt is straight and to extend substantially radially with the opposed flanges of paired egg holding clips flared and separated to egg receiving and releasing relation when the belt travels over the rollers, means to move said belt over the rollers to move eggs carried by said egg holding clips in front of the light emitting openings, and means to direct and locate eggs to fit between the adjacent paired clips when the flanges thereof are flared open radially with respect to the belt carrying roller at the egg supply end.

3. An egg testing device comprising, a case having light emitting openings formed laterally therein, light emitting means within the case, an endless belt, belt rollers mounting said endless belt with a straight portion thereof adjacent to the light emitting openings, egg holding clips carried in paired spaced relation upon said belt provided with flanges having opposed concavity on adjacent paired clips, said clips being adapted to extend in upright relation with the opposed concave sides engaging one end of and holding an egg in upright position upon the upper egg carrying portion of the belt when the belt is straight and to extend substantially radially with the opposed flanges of paired egg holding clips flared and separated to egg receiving and releasing relation when the belt travels over the rollers, means to move said belt over the rollers to move eggs carried by said egg holding clips in front of the light emitting openings, means to direct and locate eggs to fit between the adjacent paired clips when the flanges thereof are flared open radially with respect to the belt carrying roller at the egg supply end, and means to positively remove said eggs as the belt travels around the belt roller at the discharge end of the device.

4. An egg testing device comprising, a case having light emitting openings formed laterally therein, light emitting means within the case, an endless belt, belt rollers mounting said endless belt with a straight portion thereof adjacent to the light emitting openings, egg holding clips carried in paired spaced relation upon said belt provided with flanges having opposed concavity on adjacent paired clips, said paired clips being adapted to extend in upright relation and in cooperating spacing to receive and hold one end of and to carry an egg in end upright position upon the upper egg carrying portion of the belt when the belt is straight and to extend substantially radially with the opposed flanges of paired egg holding clips flared and separated from egg holding relation when the belt travels over the rollers, means to move said belt over the rollers to move eggs carried by said egg holding clips laterally in front of the light emitting openings, means to place eggs between the adjacent clips when the flanges thereof are flared radially with respect to the belt carrying roller at the egg supply end comprising an egg trough inclined to present and supply eggs end foremost to be engaged between the opposed flanges of adjacent egg holding clips at the supply end of the device, and an egg discharge trough at the discharge end of the device having portions thereof presented to positively remove an egg from proximity to the egg holding clips.

ADOLF SCHWARZKOPF.